United States Patent
Baumgart

(10) Patent No.: US 7,116,082 B1
(45) Date of Patent: Oct. 3, 2006

(54) SYNCHRONIZATION CONTROLLER FOR MULTIPLE PULSED ALTERNATOR APPLICATIONS

(75) Inventor: Gary E. Baumgart, Pittsburgh, PA (US)

(73) Assignee: Curtiss-Wright Electro-Mechanical Corporation, Cheswick, PA (US)

(*) Notice: Subject to any disclaimer, the term of this patent is extended or adjusted under 35 U.S.C. 154(b) by 54 days.

(21) Appl. No.: 11/084,227

(22) Filed: Mar. 17, 2005

(51) Int. Cl.
*H02P 9/00* (2006.01)

(52) U.S. Cl. ............................. 322/45; 322/8; 310/12; 307/87

(58) Field of Classification Search .................... 322/7, 322/8, 44, 45; 310/12, 179; 307/87
See application file for complete search history.

(56) References Cited

U.S. PATENT DOCUMENTS

| | | | | |
|---|---|---|---|---|
| 3,794,846 A | * | 2/1974 | Schlicher et al. ............. | 307/87 |
| 4,200,831 A | * | 4/1980 | Weldon et al. ................ | 322/8 |
| 4,266,180 A | * | 5/1981 | Juvan ............................ | 322/4 |
| 4,841,217 A | * | 6/1989 | Weldon et al. ................ | 322/8 |
| 5,210,452 A | * | 5/1993 | Pratap et al. ................. | 310/12 |
| 6,329,797 B1 | * | 12/2001 | Bluemel et al. ............... | 322/28 |

* cited by examiner

*Primary Examiner*—Nicholas Ponomarenko
(74) *Attorney, Agent, or Firm*—Reed Smith LLP

(57) ABSTRACT

A control concept for large pulsed power applications that use multiple pulsed alternators to generate high-energy current pulses. Pulsed alternators produce a large reaction torque during discharge, but paired pulsed alternators are characterized by equal and opposite torque which result in a negligible reaction. However, it is necessary to synchronize the pulsed alternators prior to discharge to ensure that the load current will share equally and large transient and unequal torque reactions will not occur. The present control system utilizes closed loop feedback control to synchronize two or more pulsed alternators at the discharge speed and maintain synchronization before discharge and between multiple discharges in a burst pulse mode.

20 Claims, 11 Drawing Sheets

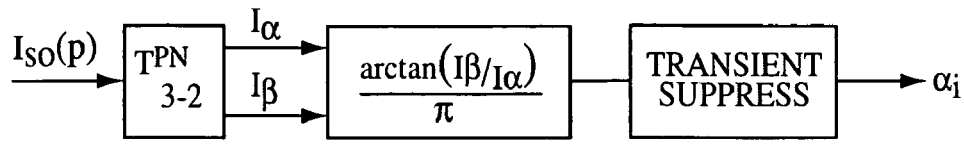
FIG. 11A
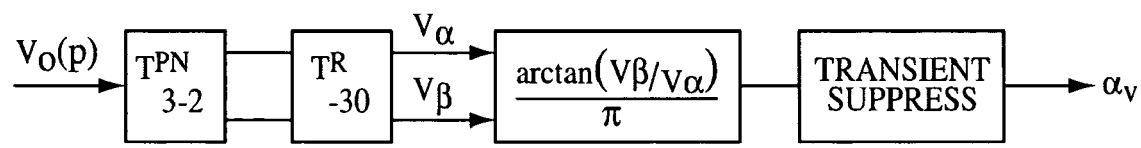
FIG. 11B
$$\boxed{\begin{matrix}T^{PN}\\3\text{-}2\end{matrix}} = \boxed{\frac{2}{3}\begin{bmatrix}\sin(0) & \sin(240) & \sin(120)\\\sin(0) & \sin(240) & \sin(120)\end{bmatrix}}$$
FIG. 11C
$$\boxed{\begin{matrix}T^R\\-30\end{matrix}} = \boxed{\begin{bmatrix}\cos(-30) & \sin(-30)\\-\sin(-30) & \cos(-30)\end{bmatrix}}$$
FIG. 11D

SYNCHRONIZATION CONTROLLER FOR MULTIPLE PULSED ALTERNATOR APPLICATIONS

BACKGROUND OF THE INVENTION

1. Field of the Invention

The present invention relates generally to systems and methods for propulsion, and, more specifically, the present invention relates to control systems for large pulsed power applications that use multiple pulsed alternators in synchronization.

2. Description of the Background

Multiple pulsed alternators have been applied to a variety of systems including electromagnetic aircraft launchers, electromagnetic rail guns, and many pulsed power systems used for laboratory experiments.

High current pulses can be provided from several types of pulse sources such as a capacitor bank or rotating electric machines. The pulsed alternator (PA) is considered to be the most effective and power dense type of pulse source. A basic pulsed alternator system designed around a single pulsed alternator requires several other components as shown in FIG. 1.

The pulsed alternator PA, field power controller FPC and load converter LC for a four-phase, four-pole poled alternator are the major components for the system shown in FIG. 1. The four-phase or four-pole machine pictured in the accompanying figures is exemplary only, and the present invention is not limited to any particular number of phases/poles. The pulsed alternator is designed to store kinetic energy that will be converted to an ac electric energy pulse by the operation of the pulsed alternator and the load converter.

Previous controls used for multiple pulsed alternator applications used only open loop, feed forward controllers with empirically developed algorithms. This control approach is based on the fact that a pulse discharge event lasts only about 5 to 10 milliseconds (ms) and a limited number of alternator voltage cycles occur during the discharge limiting the control bandwidth.

It is understood that it is necessary to synchronize the pulsed alternators in multiple parallel-connected machines prior to a discharge to ensure that the load current will share equally and large transient and unequal torque reaction will not occur during discharges. In these systems, synchronization concepts have been based only on equalizing the initial speeds of the pulsed alternators.

SUMMARY OF THE INVENTION

In accordance with at least one preferred embodiment, the present invention provides a feedback control system for synchronizing two or more pulsed alternators at the discharge speed. The control system preferably maintains synchronization before discharge and between multiple discharges in a "burst" pulse mode.

The present invention provides a means to individually ramp the pulsed alternators to the discharge speed. Conventional electric motor drives with a special rotor position control are provided to differentially control the torque and initially synchronize the machines by matching the speeds and rotor angles.

The present invention provides individual closed loop field controllers that separately control the field current of each pulsed alternator. The field controllers are provided with a special controller to differentially control the field currents of the pulsed alternators to maintain the machines in synchronism prior to a discharge and between multiple discharges in burst pulse mode operation.

The field controllers are provided with machine observer transformations to monitor the rotor angles, voltage and current angles of the pulsed alternators. The observer output is applied to the special controller to differentially control the field currents.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein:

FIG. 11 shows exemplary machine observer transformations including $T^{PN}_{3\text{-}2}$ transformations (FIGS. 11A, 11B and 1C) and $T^{R}_{\text{-}30}$ transformations (FIGS. 11B and 11D)

DETAILED DESCRIPTION OF THE INVENTION

It is to be understood that the figures and descriptions of the present invention have been simplified to illustrate elements that are relevant for a clear understanding of the invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description will be provided hereinbelow with reference to the attached drawings.

Description of Operation of a Basic Pulsed Power System

Figure 1:
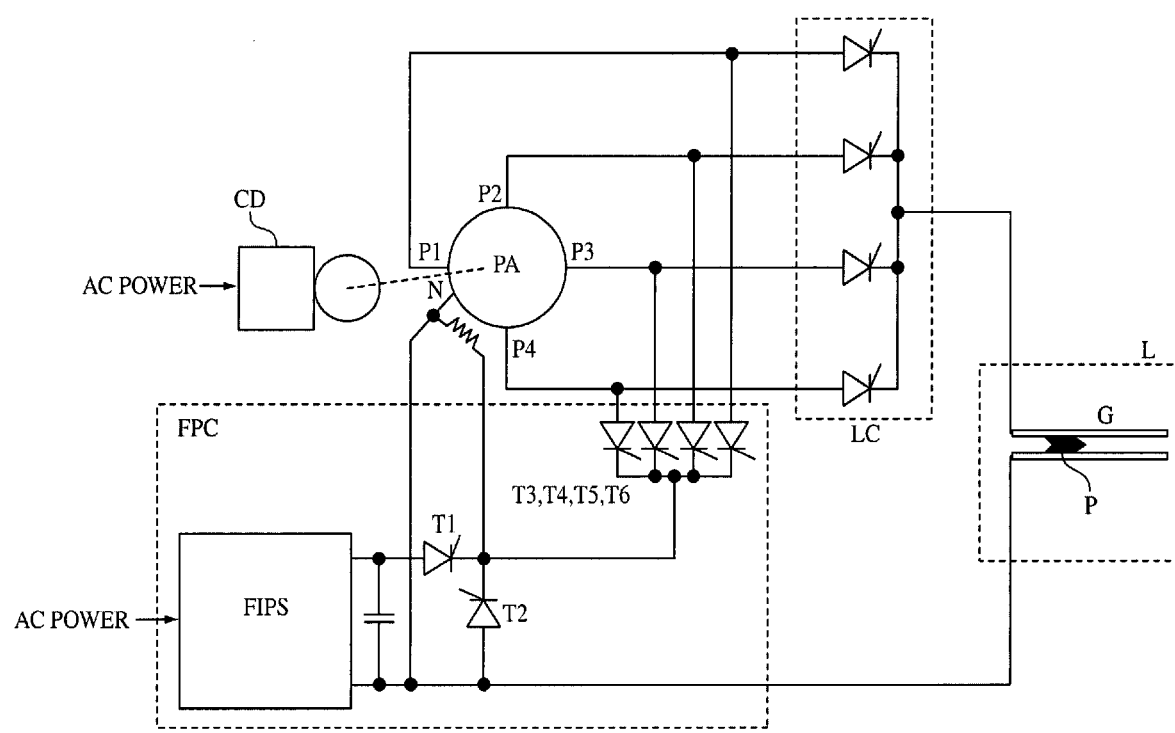
FIG. 1 shows a basic pulsed alternator system designed around a single pulsed alternator.

As briefly described above, FIG. 1 shows a basic pulsed alternator system connected to a rail gun load. In FIG. 1, a charging drive CD is connected to a pulsed alternator PA with four poles (P1, P2, P3, P4). A field power controller FPC regulates the field excitation of the pulsed alternator PA, and the four phases of the pulsed alternator are connected to a load converter LC. The load converter LC and the field power controller FPC are also connected to a load L, which in FIG. 1 is represented by an electromagnetic rail gun G used to fire a projectile P.

Generally speaking, the pulsed alternator PA requires external magnetic field excitation from a low energy source. In the present example, the field power controller FPC regulates this field excitation. The field power controller FPC preferably includes a low energy, field initiation power supply FIPS to initiate excitation. The initiation power supply FIPS converts source power to typically 5.0 to 10.0 kV dc. A dc capacitor in the initiation power supply FIPS stores approximately 0.1 MJ of energy that will be discharged into the pulsed alternator PA field to initiate excitation (see FIG. 1).

A discharge sequence begins by ramping the pulsed alternator PA up to the maximum operating speed or discharge speed. After the field initiation power supply capacitor is fully charged, thyristor T1 will be gated. The stored charge in the dc capacitor will discharge into the field winding of the pulsed alternator PA. The current in the field will typically reach levels of between 5 kA to 10 kA. At that initial level of excitation, the pulsed alternator PA produces approximately 5% to 10% of the rated terminal voltage. The field bridge, comprising thyristors T3, T4, T5, T6, will be sequentially gated to control the current in the field. Thyristor T1 will be commutated off when the field bridge begins to conduct current.

The field bridge gating (T3–T6) is preferably controlled by a current controller to regulate the current up to a level of excitation typically between 100 kA and 150 kA. If the field bridge malfunctions, or for any reason ceases to regulate the excitation current, it will automatically commutate into thyristor T2, the functionality being provided by a voltage-activated automatic gating circuit (not shown). Thyristor T2 can also be gated to cause the current to commutate from the bridge and free wheel in T2 independent of the pulsed alternator stator circuit. In this case, the current will continue to free wheel in thyristor T2 and the field inductance until it decays to zero (0) or until the field bridge is re-gated. The excitation current will then be commutated back to the bridge (T3–T6).

When the current in thyristor T2 is zero (0), the field bridge gating angle can be phased back to between 90 degrees and 130 degrees, and the stored energy in the field winding will be regenerated back to the pulsed alternator PA and converted to kinetic energy.

Closed Loop Field Control

Basic Pulsed Alternator Power System

Figure 2:
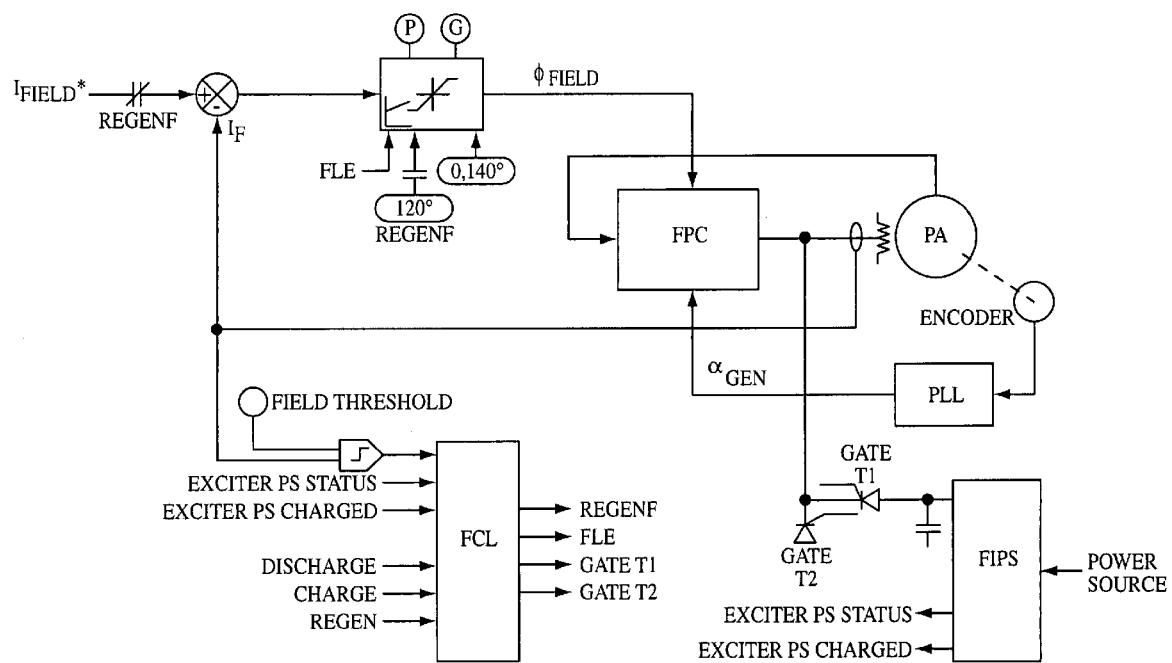
FIG. 2 shows an exemplary basic field power regulator and control logic for a pulsed alternator system.

FIG. 2 shows an exemplary basic field current regulator and control logic for a pulsed alternator system according to the present invention. The regulator is a proportional plus integral (PI) closed loop current controller. An outer voltage loop can be added to the design that will allow the pulsed alternator voltage to be regulated over the operating range for a gating angle of 0 degrees to 130 degrees.

As shown in FIG. 2, a logic sequencer is used to control the initiation of excitation and the subsequent regulation of the field current. The system sequencer will issue the DISCHARGE command (see field control logic FCL) that starts a discharge cycle and causes thyristor T1 to be gated. A comparator detects when the field initiation current has reached the threshold and causes the PI controller to release. The controller will cause the field converter to be gated. When the field power converter FPC begins to conduct field current, it will be regulated up to the reference level set by $I_{field}$. After the field has reached a predetermined value, thyristor T2 will be gated, and the DISCHARGE command will be issued. The current will free wheel through thyristor T2 during the discharge cycle.

At the end of a discharge cycle, the system sequencer will issue the REGEN command (see field control logic FCL) that will cause the field current reference to reset to zero (0). The controller will phase-back the field power converter FPC to a preset regeneration angle.

The load converter LC controls the load current during a discharge cycle, and the system controller regulates the load converter bridge. There are several control strategies that can be used to regulate the load current, but, in general, the controller will cause the system to generate an approximately trapezoidal current pulse at 5 to 10 ms duration for each discharge.

Dual Pulsed Alternator Power System

Figure 3:
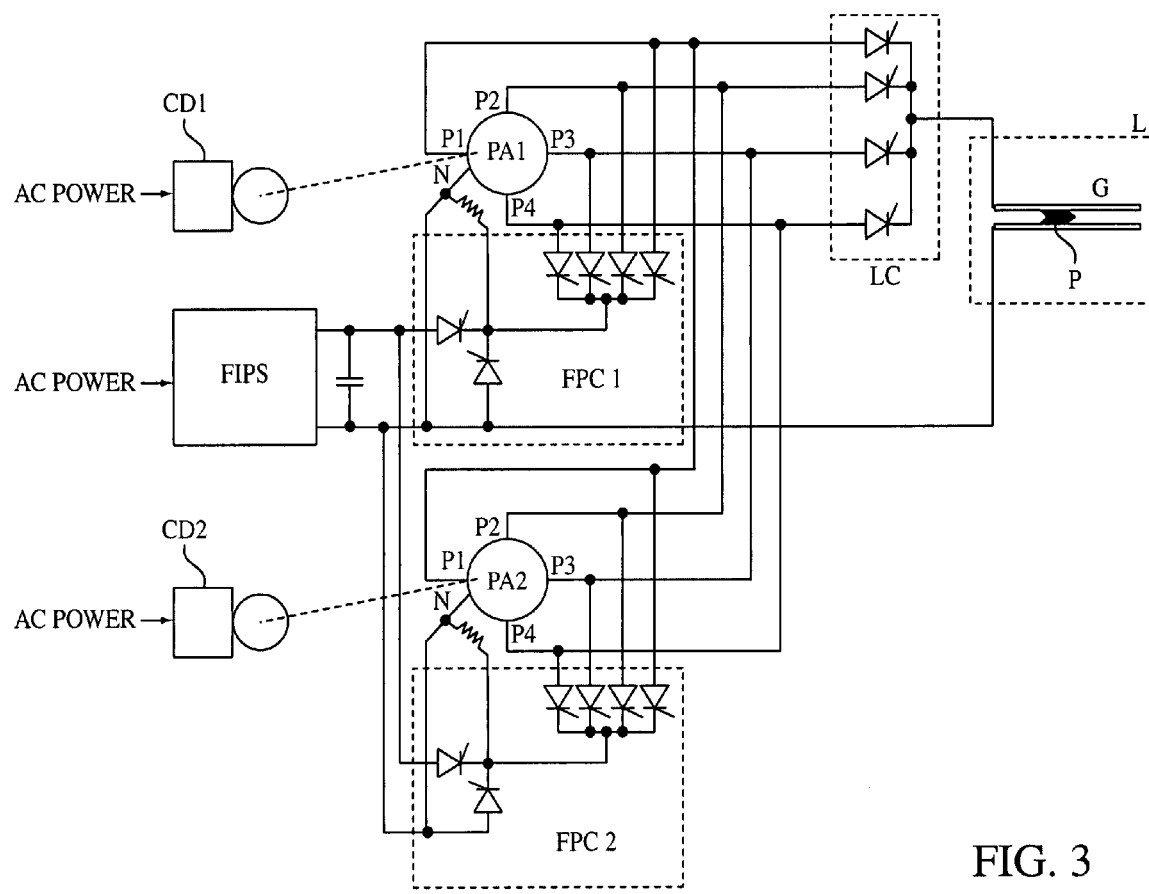
FIG. 3 shows an exemplary dual pulsed alternator system with independently controlled fields.

FIG. 3 shows an exemplary dual pulsed alternator system with independently controlled fields (compare to the single alternator configuration of FIG. 1). FIG. 3 details first and second charging drives CD1, CD2 connected to first and second pulsed alternators PA1, PA2. The windings of these pulsed alternators PA1, PA2 are controlled by first and second field power controllers FPC1, FPC2 which are powered through a single field initiation power supply FIPS. The four phases (P1, P2, P3, P4) of the two pulsed alternators PA1 and PA2 are connected to the load converter LC which is then connected to a load L represented by an electromagnetic rail gun G for firing a projectile P.

In FIG. 3, the pulsed alternator PA produces a large reaction torque during a discharge due to the high-energy pulsed alternator. If two counter rotating pulsed alternators (e.g., PA1, PA2) are mechanically coupled, the reaction torque for the two machines will be equal and opposite, and will result in zero (0) net reaction to the mechanical system. Multiple pulsed alternator systems can therefore be designed in groups of two pulsed alternators (e.g., PA1, PA2) to provide greater firepower. This translates to larger projectiles with higher kinetic energy, higher muzzle velocity and/or higher projectile bursts.

There are two basic circuits for connecting the pulsed alternators PA1, PA2 and configuring the power system: (1) series the stators; and (2) parallel the stators. There are, however, many variations to each of these basic circuits. For the purposes of the present discussion, a dual pulsed alternator system configured for parallel-pulsed alternators as shown in FIG. 3 will be considered in detail. This configuration allows individually controllable field power converters FPC1, FPC2 and a single controllable load converter LC. The parallel stator configuration inherently forces the terminal voltages to be equal, and the motor drive controls will regulate the initial speed and rotor angles of each pulsed alternator PA1, PA2 to be closely matched prior to a discharge. This allows stator currents to be closely matched during a discharge.

Figure 4A:
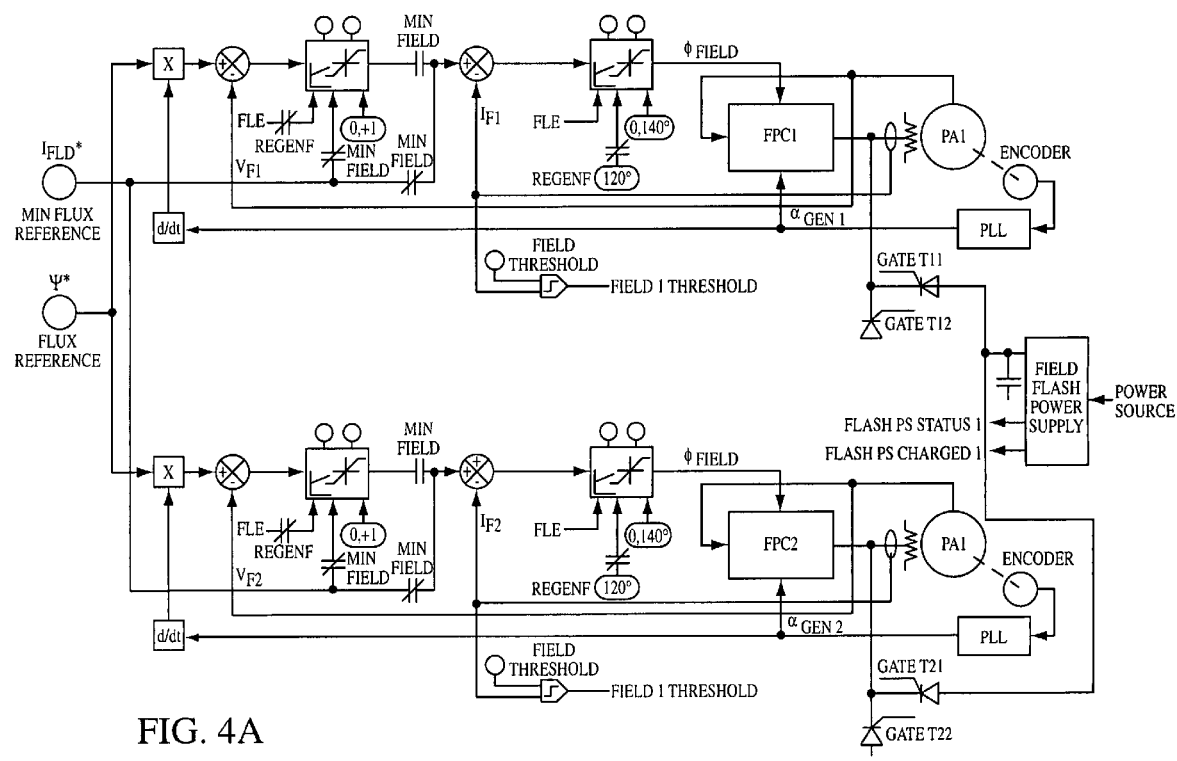
FIG. 4 depicts a dual pulsed alternator system with individual constant flux control including a field power controller regulator (FIG. 4A) and the corresponding control logic (FIG. 4B)
Figure 4B:
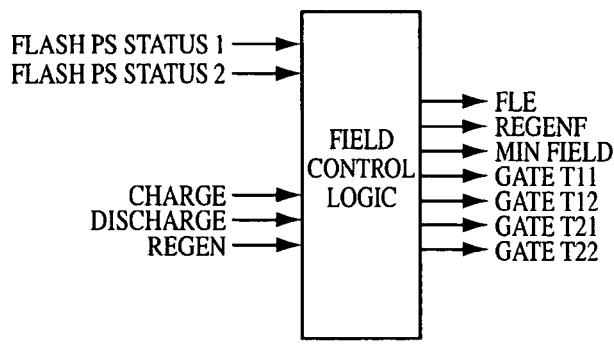
Figure 5B:
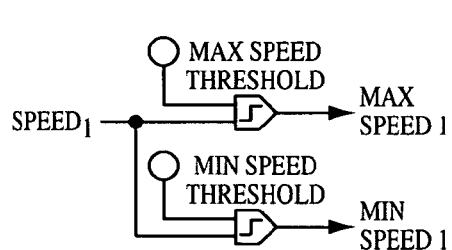
FIG. 5 shows an exemplary motor drive synchronization controller including a high level circuit diagram (FIG. 5A), a first alternator threshold speed calculation (FIG. 5B), a second alternator threshold speed calculation (FIG. 5E), a speed combination (FIG. 5D) and a charging drive and SYNC control logic (FIG. 5C)
Figure 5C:
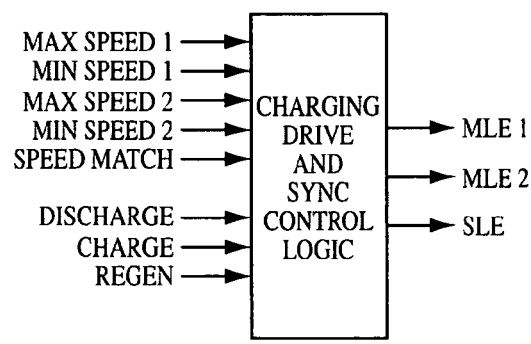
Figure 5D:
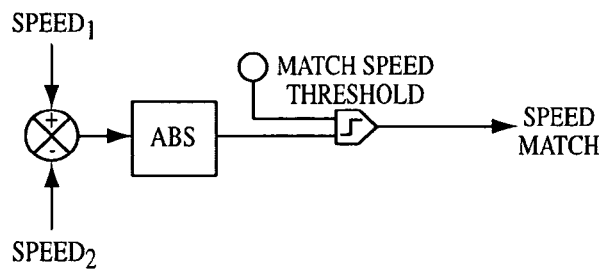
Figure 5E:
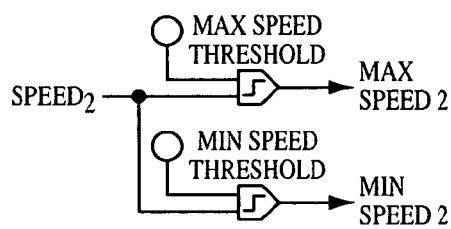
Figure 5A:
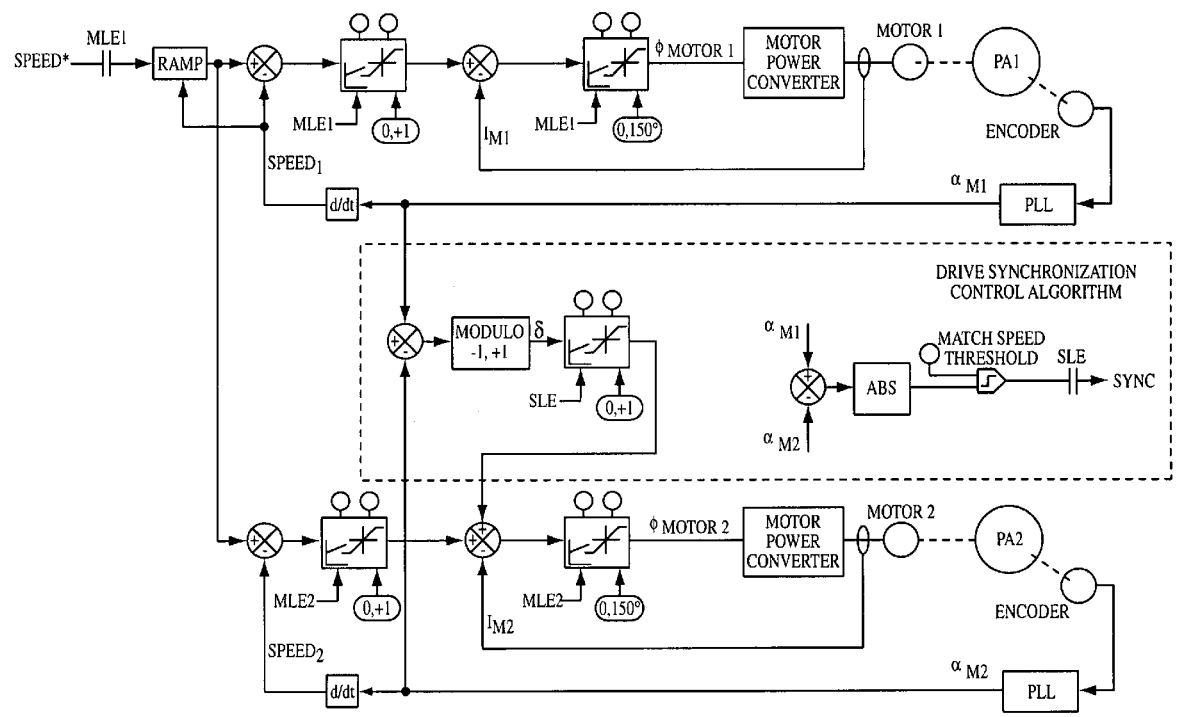

FIG. 4A generally shows a field power controller regulator and FIG. 4B shows the control logic for a dual pulsed alternator system with individual constant flux control. The dual field regulator includes outer voltage loops that control each pulsed alternator to equal flux. Each pulsed alternator field is controlled by an independent current controller and regulated for either equal current or unity power factor depending on the state of the system operation. Compare FIG. 4A to FIG. 2 for details.

Closed Loop Synchronization Control

FIG. 5 generally shows a motor drive synchronization controller for a dual pulsed alternator system. Specifically, FIG. 5A shows one exemplary motor drive synchronization controller for a dual phased alternator system. FIGS. 5B and 5E shows the creation of MIN/MAX settings for the two alternator speeds (Speed$_1$, Speed$_2$), and FIG. 5D shows the combination of the two alternator speeds (Speed$_1$, Speed$_2$) into a value SpeedMatch. FIG. 5C shows an exemplary charging drive and SYNC control logic utilizing the values created in FIGS. 5B–5D.

When multiple pulsed alternators PA1, PA2 are connected in parallel, it is necessary to synchronize the machine rotors prior to a discharge. If the pulsed alternators PA1, PA2 are not synchronized, the load current will not share equally and a large transient and unequal torque reaction will occur during discharges. This will produce unequal stress and heating in the pulsed alternators, and it reduces the effectiveness of the pulsed alternators. If the pulsed alternator terminals are connected together the system will trend to the lowest energy state in which the air gap voltages in each pulsed alternator are in phase and equal. If the pulsed alternators were not controlled, large synchronizing torques would be produced that would cause each pulsed alternator to rapidly accelerate toward a minimum rotor phase error given by $\delta=\delta_{min}$. This process would produce mechanical instability and high stress in the pulsed alternator.

Two exemplary mechanisms are provided according to the present invention to synchronize the pulsed alternators. The first mechanism consists of the charging motor drive system used to charge the system with kinetic energy by ramping the pulsed alternators up to the maximum discharge speed. The charging motor drive system includes the charging drive motors for each pulsed alternator and the power converters to control the drive motors. The configuration for these components is shown in FIG. 5 for a dual pulsed alternator system.

Initial Synchronization By Motor Drive

The synchronization of the multiple pulsed alternators PA1, PA2 is initiated by the CHARGE command (see FIG. 5E) that causes the drive motor control loops to close and ramp the pulsed alternators PA1, PA2 to the maximum operating speed or discharge speed. The speed of each pulsed alternator PA1, PA2 is individually controlled with the same speed reference. Each drive has an independent speed and current controller to control the speed and torque of each pulsed alternator PA1, PA2 during charging. When each pulsed alternator is ramped to and operating at the discharge speed the control mode will switch to rotor position control. The rotor position of each pulsed alternator will be compared. The angle $\delta$ is the difference between the rotor angles given by $\delta=\alpha_{m1}-\alpha_{m2}$. $\delta$ is a stated domain variable that when transformed to the time domain and integrated will generate a signal proportional to the synchronizing torque. When that signal is added to the current reference of the second motor drive, it will force the machine speed to increase or decrease until $\delta$ is 0.0.

After the pulsed alternators PA1, PA2 are synchronized, by this mechanism, the charging motor drives will be deactivated and each pulsed alternator coasts. The field current is then activated and synchronization will be maintained by the second mechanism. This mechanism will use differential flux control to force the rotor phase error to a minimum value ($\delta_{min}$) sufficient to hold the machines in synchronism against any differential load torque.

Maintaining Synchronization by Differential Field Excitation and Rotor Angle Control Each pulsed alternator PA1, PA2 is independently excited and controlled by an inner current loop and outer voltage loop as previously shown in FIG. 4. The outer voltage loop regulates the flux of the machines, and the field current will be ramped from a minimum level to the full flux. During this period, pulsed alternator synchronism may be maintained by differential flux control.

The outer voltage loop controllers independently regulate the flux in each pulsed alternator PA1, PA2 to a predetermined value. After the fields have reached a predetermined value, for each field circuit, thyristor T2 will be gated and the DISCHARGE command will be issued. The current will free wheel through T2 during the discharge cycle.

During the discharge, the pulsed alternator rotor angles will not be regulated and will be allowed to drift slightly due to differences in the machine parameters. At the end of a discharge cycle, the system sequencer will issue the REGEN command that will cause the current reference to reset to zero (0) and the controller to phase-back the field converter to a preset regeneration angle.

During the intervals between discharges, each field may be maintained at a minimum field current level, preset to the current reference ($I_{field}*$), to reduce energy losses and heating in the pulsed alternators. At the minimum field current level, pulsed alternator synchronism may be maintained by differential flux control.

This cycle will be repeated until the pulsed alternator speed is reduced to the minimum operating speed. At that point, the charging motor drive will be reactivated to drive the system back to the maximum operating speed.

Principle of Operation For Rotor Angle Control

Figure 6:
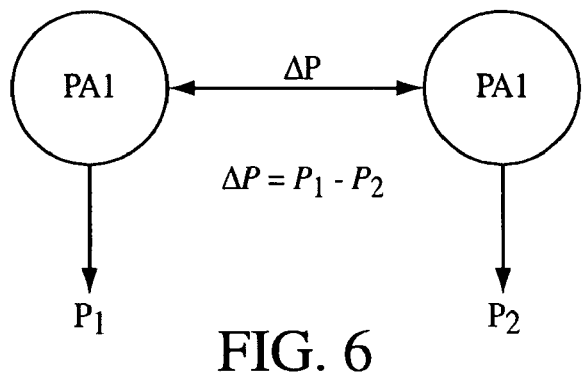
FIG. 6 is a power flow diagram for an independently excited dual pulsed alternator system with phase terminals connected together.

The principle of operation for the rotor angle control used to maintain synchronism of the pulsed alternators PA1,PA2 prior to a discharge and during the interval s between burst pulse discharges is based on the characteristics of a separately excited synchronous motor. FIG. 6 is a power flow diagram for an independently excited dual pulsed alternator system with phase terminals connected together. Specifically, FIG. 6 represents a system in which two free spinning machines are designated as PA1 and PA2. The machines PA1,PA2 should have separately and independently controlled exciters with the stator phase terminations directly connected. It will be assumed that the pulsed alternator impedance has insignificant resistance and capacitance.

Each pulsed alternator PA1,PA2 must be considered to have independent mechanical loads on the rotor given by $T_1$ and $T_2$. These loads $T_1$,$T_2$ are caused by windage and friction. If the mechanical loads are not equal, then a differential load exists given by $\Delta T$. If the pulsed alternators PA1,PA2 are synchronized and operating at the same rotor speed given by $\omega$ then the mechanical power flow $P_1$,$P_2$ for each pulsed alternator is given by the following equations 1 and 2:

$$P_1=T_1\cdot\omega \quad \text{(equation 1)}$$

$$P_2=T_2\cdot\omega \quad \text{(equation 2)}$$

The electrical power flow between the dual pulsed alternators is a result of a differential torque that may exist for the dual pulsed alternators given by the equation: $\Delta T \equiv T_1 - T_2$. Because the stator phase terminations are directly connected, the terminal voltage for each pulsed alternator PA1, PA2 is the same (given by $V_o$) and the phase currents have the same magnitude where: $I_o \equiv I_1 = -I_2$.

Figure 7:
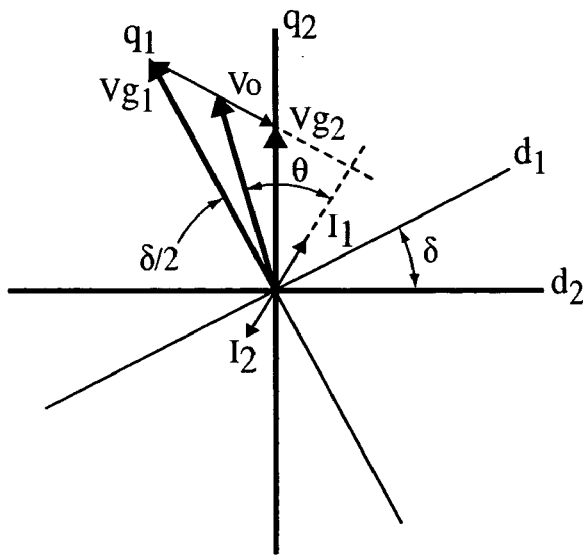
FIG. 7 is a phasor diagram for synchronized identical pulsed alternators with unequal excitation and unequal mechanical loads.

FIG. 7 is a phasor diagram for synchronized identical pulsed alternators with unequal excitation and unequal mechanical loads. In other words, FIG. 7 generally depicts the dual pulsed alternators PA1,PA2 with differential loading and that have been differentially excited. The differential excitation will cause one pulsed alternator (e.g., PA1) to have a higher air gap voltage ($Vg_1$) when compared to the other pulsed alternator (PA2) with air gap voltage ($Vg_2$). The differential loading will cause quadrature axis current to flow in each pulsed alternator. The rotors of the two synchronized pulsed alternators will be displaced by an angle δ. The system will also require direct axis current to compensate the differential air gap voltage, and, as a result, the terminal power factor will be less than 1.0 (as shown in equation 3).

$$PF = \cos(\theta), \delta = \delta \qquad \text{(equation 3)}$$

The differential power flow between the dual pulsed alternators PA1,PA2 can be calculated from the well-known power transmission or power flow equation as shown below in equations 4 and 5.

$$\Delta P = P_1 - P_2 = \Delta T \cdot \omega \qquad \text{(equation 4)}$$

$$\Delta P = 4 \cdot \frac{Vg_1 \cdot Vg_2}{2 \cdot X_d''} \cdot \sin(\delta) \qquad \text{(equation 5)}$$

Where $Vg_1$ is the air gap voltage for pulsed alternator PA1, $Vg_2$ is the air gap voltage for pulsed alternator PA2, $X_d''$ is the sub-transient reactance of each pulsed alternator PA1,PA2 and δ is the angle between the pulsed alternator rotors ($d_1, d_2$).

ΔP is equal to the power flow for each pulsed alternator PA1,PA2 that can be calculated based on the voltage and current as follows:

$$\Delta P = \Delta T_1 \cdot \omega = 4 \cdot Vg_1 * I_1 \qquad \text{(equation 6)}$$

$$-\Delta P = \Delta T_2 \cdot \omega = -4 \cdot Vg_2 * I_2 \qquad \text{(equation 7)}$$

$$\Delta P = 4 \cdot |Vg_1| \cdot |I_1| \cdot \cos\left(\frac{\delta}{2}\right) \qquad \text{(equation 8)}$$

$$-\Delta P = -4 \cdot |Vg_2| \cdot |I_2| \cdot \cos\left(\frac{-\delta}{2}\right) \qquad \text{(equation 9)}$$

ΔP is equal to the power flow calculated at the pulsed alternator terminals given by:

$$\Delta P = 4 \cdot |V_o| \cdot |I_o| \cdot \cos(\theta) = 4 \cdot V_o * I_o \qquad \text{(equation 10)}$$

$$PF = \cos(\theta) = 1.0, \delta = 0.0 \qquad \text{(equation 11)}$$

For the general case, the rotors of the two synchronized pulsed alternators PA1,PA2 will be displaced by an angle δ and the terminal power factor is given by cos(θ).

Figure 8:
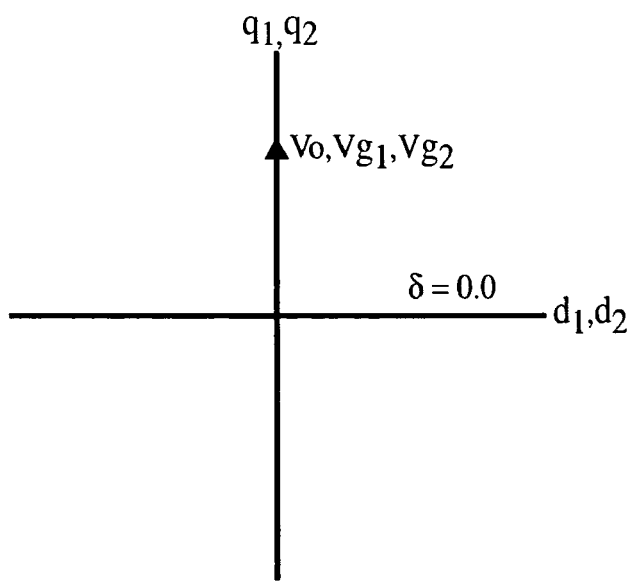
FIG. 8 is a phasor diagram for synchronized identical pulsed alternators with equal excitation and equal mechanical loads.

However, if the pulsed alternators PA1,PA2 are equally excited and there is no differential loading on the pulsed alternator (an ideal case), then the phasor diagram will appear as in FIG. 8. The angle between the rotors will be δ=0.0. Because there is no differential loading on the pulsed alternators PA1,PA2, the quadrature axis currents will be zero, and no direct axis current will be required to compensate a differential air gap voltage. Therefore, the terminal current will be zero and the terminal power factor will be 0.0 (equation 12).

$$PF = \cos(\theta) = 0.0, \delta = 0.0 \qquad \text{(equation 12)}$$

Figure 9:
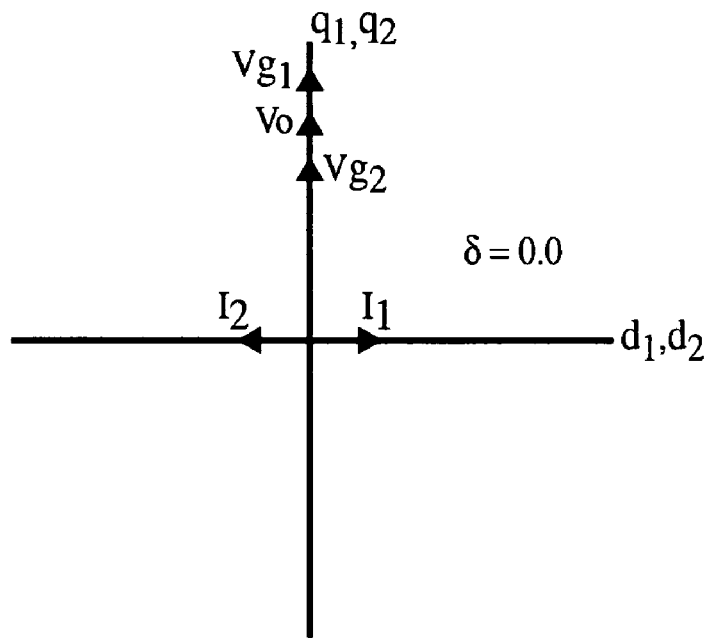
FIG. 9 is a phasor diagram for synchronized identical pulsed alternators with unequal excitation and equal mechanical loads.

If the dual pulsed alternators PA1,PA2 are not equally excited and there is no differential loading on the pulsed alternator (another hypothetical case), then the phasor diagram will appear as in FIG. 9. The angle between the rotors will be δ=0.0. However, the air gap voltages in each pulsed alternator will be different, and direct axis current will be generated in one pulsed alternator to supply the other. The terminal voltage will be midway between the two air gap voltages. No quadrature axis current will flow in either pulsed alternator and the terminal power factor will be PF=0.0.

Figure 10:
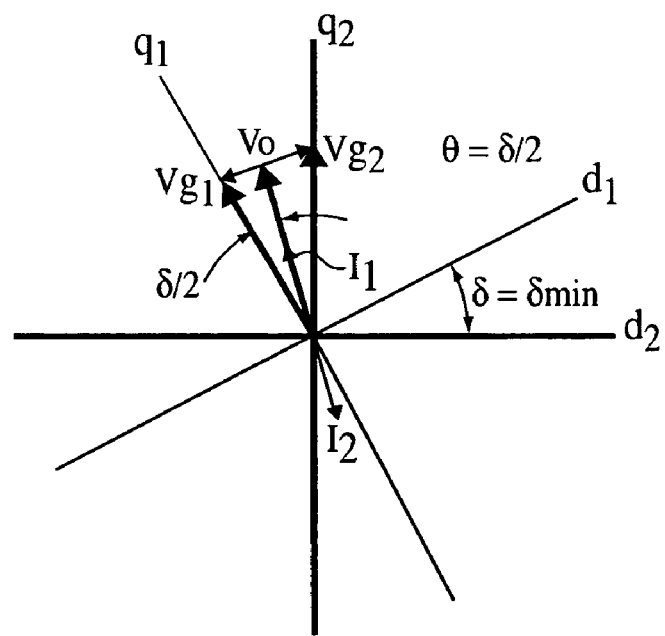
FIG. 10 is a phasor diagram for synchronized identical pulsed alternators with equal excitation and unequal mechanical loads.

The final case that is shown in FIG. 10 is for dual pulsed alternators PA1,PA2 synchronized and equally excited. However, the pulsed alternators PA1,PA2 are differentially loaded and will require quadrature axis current. The rotors of the two synchronized pulsed alternators PA1,PA2 will be displaced by an angle δ.

The system will not require direct axis current to compensate for a differential air gap voltage and as a result the terminal power factor will be PF=1.0 (equation 13).

$$PF = \cos(\theta) = 1.0, \delta = \delta_{min} \qquad \text{(equation 13)}$$

It must be assumed in actual applications that there will be a differential loading on the dual pulsed alternators. Therefore, there will be a minimum angle ($\delta_{min}$) between the two pulsed alternator rotors to support the differential torque necessary to keep the two rotors in synchronism as shown in FIG. 10. To minimize transient and unequal torque reaction during discharges, it will be necessary to maintain the angle δ to $\delta_{min}$ during the interval between discharges and prior to a discharge. To achieve this objective, the pulsed alternator angle θ will be regulated to θ=0.0.

To implement this type of control, an observer is required for the pulsed alternator terminal voltage angle $\alpha_v$ (FIG. 11B) and phase current angle $\alpha_i$ (FIG. 11A). The three-phase line-to-line voltage is transformed to the equivalent two-phase wave using the $T^{PN}_{3-2}$ transform (FIG. 11C), and the wave is then rotated −30 degrees using the $T^R_{-30}$ (FIG. 1D). The phase voltage angle can be extracted from the resulting wave using the inverse tangent function, and the angle $\alpha_v$ is a saw-tooth waveform.

A similar process is used to develop the pulsed alternator phase current angle $\alpha_i$. all of the relevant observer algorithms are shown in FIG. 11.

Figure 12A:
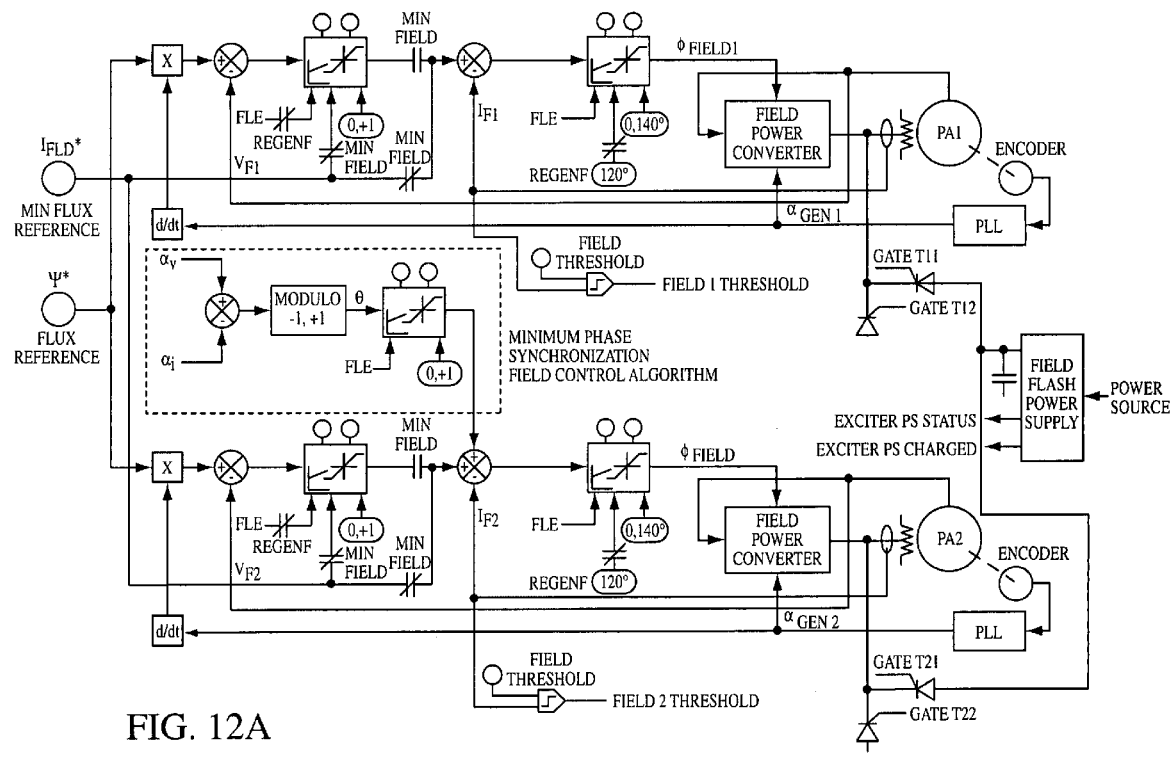
FIG. 12 depicts a block diagram of a field synchronization controller for dual pulsed alternator systems (FIG. 12A) with accompanying logic (FIG. 12B) and field control logic (FIG. 12C).
Figure 12B:
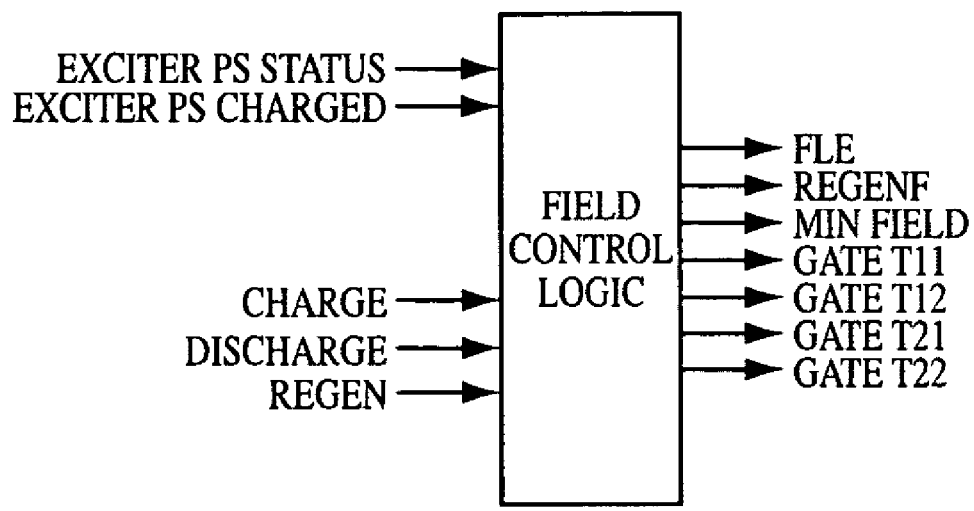
Figure 12C:
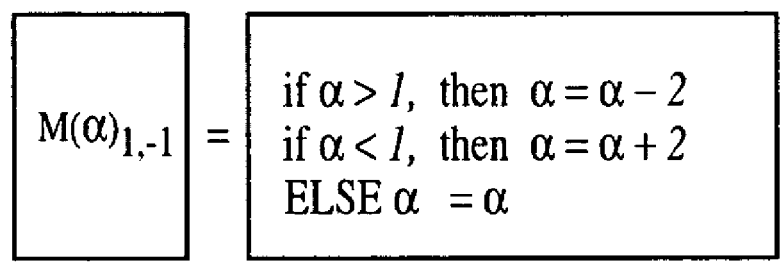

FIG. 4 is a basic field power controller (FIG. 4A) and control logic (FIG. 4B) for a dual pulsed alternators system with individual constant flux with regulators. That basic system design did not have the capability to maintain the pulsed alternator rotor angle δ=$\delta_{min}$ and θ=0.0 during the interval between discharges, where the angle θ is the difference between the pulsed alternator phase voltage angle and the phased current angle given by θ=$\alpha_v$−$\alpha_i$. θ is therefore a state domain variable that, when transformed to the time domain and integrated, will generate a signal proportional to the field current. When that signal is added to the field current reference signal of the second pulsed alternator, it will force the machine flux to increase or decrease until θ=0.0. At that condition, δ=$\delta_{min}$ and the system is ready for a discharge. The differential flux control algorithm for this function is shown in FIG. 12A. Logic functions related thereto are shown in FIGS. 12B and 12C.

According to the present invention, a versatile control strategy is employed for individually controlling the field excitation for a system with multiple pulsed alternators. The control system can accelerate the pulsed alternators to discharge speed, synchronize the machines and maintain synchronism prior to a discharge and during the interval between discharges. The system can also free wheel the excitation current through a controlled thyristor independent of the pulsed alternator stator circuit during discharge. The controller can regenerate the energy stored in the field inductance back to pulsed alternator kinetic energy at the end of a discharge cycle to reduce unequal and transient torques that would cause unequal stress and heating in the machines. These features provide a high level of system performance with minimal losses.

Nothing in the above description is meant to limit the present invention to any specific materials, geometry, or orientation of elements. Many part/orientation substitutions are contemplated within the scope of the present invention and will be apparent to those skilled in the art. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered only to facilitate comprehension of the invention and should not be construed to limit the scope thereof.

What is claimed is:

1. A system for controlling parallel-pulsed alternators, comprising:
    a first pulsed alternator characterized by a speed and a rotor angle;
    a second pulsed alternator characterized by a speed and a rotor angle, wherein said first and second alternators are alternatingly brought up to a discharge speed and then pulsed; and
    a closed loop controller operatively coupled to said first and second pulsed alternators, said controller being based on differential torque of said first and second pulsed alternators and being adapted to adjust the speed and rotor angle of the second pulsed alternator to match the speed and rotor angle of the first pulsed alternator at discharge speed.

2. The system of claim 1, wherein said closed loop controller comprises a proportional plus integral controller (PI) to drive the difference between the rotor angles of said first and second alternators to zero.

3. The system of claim 1, wherein said closed loop controller is adapted to adjust the torque in the first and/or second pulsed alternators.

4. The system of claim 1, wherein said closed loop controller maintains synchronization between said first and second pulsed alternators between successive discharges in a burst pulse mode operation.

5. The system of claim 4, wherein said control is based on differential flux control.

6. The system of claim 5, wherein said differential flux control comprises regulating the machine power factor angle of the first and second pulsed alternators to force the rotors of said first and second pulsed alternators to a minimum torque angle required to maintain synchronization.

7. The system of claim 6, wherein said controller further comprises a proportional plus integral controller (PI) to drive the power factor angle to zero.

8. The system of claim 1, further comprising:
    a first machine observer for monitoring the voltage angle $\alpha_v$ and phase current angle $\alpha_i$ of the first pulsed alternator.

9. The system of claim 8, further comprising:
    a second machine observer for monitoring the voltage angle $\alpha_v$ and phase current angle $\alpha_i$ of the second pulsed alternator.

10. The system of claim 6, wherein said controller utilizes a $T^{PN}_{3\text{-}2}$ transform.

11. The system of claim 6, wherein said controller utilizes a $T^R_{\text{-}90}$ go transform.

12. A method for synchronizing two pulsed alternators, comprising the steps of:
    providing a first pulsed alternator characterized by a speed and a rotor angle;
    providing a second pulsed alternator characterized by a speed and a rotor angle, wherein said first and second alternators are alternatingly brought up to a discharge speed and then pulsed; and
    controlling said first and second pulsed alternators using a closed loop controller operatively coupled to said first and second pulsed alternators, wherein said controlling step is based on differential torque of said first and second pulsed alternators and includes the step of adjusting the speed and rotor angle of the second pulsed alternator to match the speed and rotor angle of the first pulsed alternator at discharge speed.

13. The method of claim 12, wherein said controlling step includes using a proportional plus integral controller (PI) to drive the difference between the rotor angles of said first and second alternators to zero.

14. The method of claim 12, wherein said controlling step includes adjusting the torque in the first and/or second pulsed alternators.

15. The method of claim 12, further comprising the step of:
    Providing successive discharges in a burst pulse mode operation, wherein said closed loop controller maintains synchronization between said first and second pulsed alternators between successive discharges in a burst pulse mode operation.

16. The method of claim 12, further comprising the step of:
    monitoring the voltage angle $\alpha_v$ and phase current angle $\alpha_i$ of the first pulsed alternator with a first machine observer.

17. The method of claim 16, further comprising the step of:
    monitoring the voltage angle $\alpha_v$ and phase current angle $\alpha_i$ of the second pulsed alternator with a second machine observer.

18. The method of claim 12, wherein said controller utilizes a $T^{PN}_{3\text{-}2}$ transform.

19. The method of claim 12, wherein said controller utilizes a $T^R_{\text{-}90}$ transform.

20. A system for controlling parallel-pulsed alternators, comprising:
    a first pulsed alternator characterized by a speed and a rotor angle;
    a second pulsed alternator characterized by a speed and a rotor angle, wherein said first and second alternators are alternatingly brought up to a discharge speed and then pulsed;
    a first machine observer for monitoring the voltage angle $\alpha_v$ and phase current angle $\alpha_i$ of the first pulsed alternator;

a second machine observer for monitoring the voltage angle $\alpha_v$ and phase current angle $\alpha_i$ of the second pulsed alternator; and a closed loop controller operatively coupled to said first and second pulsed alternators, said controller being based on differential torque of said first and second pulsed alternators and being adapted to adjust the speed and rotor angle of the second pulsed alternator to match the speed and rotor angle of the first pulsed alternator at discharge speed, further wherein said controller comprises a proportional plus integral controller (PI) to drive the power factor angle to zero.

* * * * *